US012211256B2

(12) United States Patent
Okazaki et al.

(10) Patent No.: US 12,211,256 B2
(45) Date of Patent: Jan. 28, 2025

(54) IMAGE RECOGNITION SUPPORT APPARATUS, IMAGE RECOGNITION SUPPORT METHOD, AND IMAGE RECOGNITION SUPPORT PROGRAM

(71) Applicant: HITACHI, LTD., Tokyo (JP)

(72) Inventors: Soichiro Okazaki, Tokyo (JP); Quan Kong, Tokyo (JP); Tomoaki Yoshinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 17/678,309

(22) Filed: Feb. 23, 2022

(65) Prior Publication Data

US 2022/0398831 A1 Dec. 15, 2022

(30) Foreign Application Priority Data

Jun. 14, 2021 (JP) ................. 2021-098552

(51) Int. Cl.
*G06V 10/776* (2022.01)
*G06V 10/764* (2022.01)
*G06V 10/774* (2022.01)
*G06V 10/80* (2022.01)
*G06V 10/94* (2022.01)

(52) U.S. Cl.
CPC .......... *G06V 10/776* (2022.01); *G06V 10/764* (2022.01); *G06V 10/774* (2022.01); *G06V 10/809* (2022.01); *G06V 10/945* (2022.01)

(58) Field of Classification Search
None
See application file for complete search history.

(56) References Cited

U.S. PATENT DOCUMENTS

| 2021/0089964 A1 | 3/2021 | Zhang et al. | |
| 2021/0312179 A1* | 10/2021 | Lee | G06F 16/5838 |
| 2022/0058496 A1* | 2/2022 | Rusk | G06N 5/04 |
| 2022/0237800 A1* | 7/2022 | Iyer | G06F 18/217 |

FOREIGN PATENT DOCUMENTS

| JP | 2019-046095 A | 3/2019 |
| JP | 2021-022377 A | 2/2021 |

(Continued)

OTHER PUBLICATIONS

"Tendency, N., Sense 1.a." Oxford English Dictionary, Oxford UP, Mar. 2024, https://doi.org/10.1093/OED/8423673612. (Year: 2024).*

(Continued)

*Primary Examiner* — Amandeep Saini
*Assistant Examiner* — Caroline Tabancay Duffy
(74) *Attorney, Agent, or Firm* — Foley & Lardner LLP

(57) ABSTRACT

The invention supports creation of models for recognizing attributes in an image with high accuracy. An image recognition support apparatus includes an image input unit configured to acquire an image, a pseudo label generation unit configured to recognize the acquired image based on a plurality of types of image recognition models and output recognition information, and generate pseudo labels indicating attributes of the acquired image based on the output recognition information, and a new label generation unit configured to generate new labels based on the generated pseudo labels.

12 Claims, 9 Drawing Sheets

(56) References Cited

FOREIGN PATENT DOCUMENTS

| | | | |
|---|---|---|---|
| KR | 20150086812 A | * | 7/2015 |
| WO | WO-2021/044591 A1 | | 3/2021 |

OTHER PUBLICATIONS

Moreira, A., Prats-Iraola, P., Younis, M., Krieger, G., Hajnsek, I., & Papathanassiou, K. P. (2013). A tutorial on synthetic aperture radar. IEEE Geoscience and Remote Sensing Magazine, 1(1), 6-43. https://doi.org/10.1109/MGRS.2013.2248301 (Year: 2013).*

J. Mo, Y. Gan and H. Yuan, "Weighted Pseudo Labeled Data and Mutual Learning for Semi-Supervised Classification," in IEEE Access, vol. 9, pp. 36522-36534, 2021, doi: 10.1109/ACCESS.2021.3063176. (Year: 2021).*

Extended European Search Report issued in corresponding EP Patent Application No. 22157969, dated Sep. 2, 2022 (11 pages).

Hao-Chiang Shao et al: "Ensemble Learning with Manifold-Based Data Splitting for Noisy Label Correction", arXiv.org, Mar. 13, 2021, pp. 1-12.

Mo Jianwen et al: "Weighted Pseudo Labeled Data and Mutual Learning for Semi-Supervised Classification", IEEE Access, IEEE, USA, vol. 9, Mar. 2, 2021, pp. 36522-36534.

Tanaka Daiki et al: "Joint Optimization Framework for Learning with Noisy Labels", 2018 IEEE/CVF Conference on Computer Vision and Pattern Recognition, IEEE, Jun. 18, 2018, pp. 5552-5560.

Japanese Office Action issued in corresponding JP Application No. 2021-098552, dated Nov. 5, 2024 with English translation (5 pages).

Nobuhiko Yamaguchi, "Integrated Method of Pairwise Coupling Using ILR", Technical Research Report of Institute of Electronics, Information and Communication Engineers, Institute of Electronics Information Communication Engineers, Jan. 9, 2006, vol. 105, No. 658, pp. 97-101.

* cited by examiner

INTEGRATED DB — 205

| IMAGE ID | TIME | Epoch | ORIGINAL LABEL | PSEUDO LABEL | NEW LABEL |
|---|---|---|---|---|---|
| 1 | XX:XX | 1 | (x111,x112···,x11C) | (y111,y112···,y11C) | (z111,z112···,z11C) |
| ... | ... | ... | ... | ... | ... |
| 1 | XX:XX | M | (x1M1,x1M2···,x1MC) | (y1M1,y1M2···,y1MC) | (z1M1,z1M2···,z1MC) |
| ... | ... | ... | ... | ... | ... |
| N | XX:XX | 1 | (xN11,xN12···,xN1C) | (yN11,yN12···,yN1C) | (zN11,zN12···,zN1C) |
| ... | ... | ... | ... | ... | ... |
| N | XX:XX | M | (xNM1,xNM2···,xNMC) | (yNM1,yNM2···,yNMC) | (zNM1,zNM2···,zNMC) |

Columns: 302, 303, 304, 305, 306, 307

NEW LABEL GENERATION PROCESS S1005

IMAGE RECOGNITION SUPPORT APPARATUS, IMAGE RECOGNITION SUPPORT METHOD, AND IMAGE RECOGNITION SUPPORT PROGRAM

BACKGROUND OF THE INVENTION

1. Field of the Invention

The present invention relates to an image recognition support apparatus, an image recognition support method, and an image recognition support program.

2. Description of the Related Art

By automatically recognizing a captured image, it is possible to specify attributes of subjects in the image and know events recorded in the image. For example, aerial images and satellite images of a disaster site are useful as a means for remotely grasping a situation at the site, and in particular, it is possible to quickly grasp a disaster situation by simultaneously recognizing attributes in a wide area image. In order to create a classifier that automatically recognizes and classifies attributes captured in an image for such a purpose, it is necessary to prepare pairs of images and labels (correct labels) showing all the attributes in the image as learning data, and to cause the classifier to learn these pairs as patterns. Herein, the pairs of images and labels are called learning data.

However, in the preparation of the learning data, it is difficult to accurately prepare all correct labels in a wide area image. In particular, when a person sets a label in an image, an incorrect label may be obtained by attaching a label of an incorrect attribute, or a label defect may occur due to failing to attach a label despite a corresponding attribute is included in the image. Further, when learning the patterns of the image and the labels, the accuracy of a classifier may be reduced when the classifier is created using learning data including an incorrect label. Therefore, in order to correctly recognize an attribute in a target image without reducing the accuracy of the classifier, it is necessary to correct a label that a person attaches to the image.

As an image recognition support apparatus and a method for correcting a label set by a person, for example, JP-A-2019-46095 (Patent Literature 1) is known. Patent Literature 1 describes that reliability relating to an attribute output from an image recognition unit is acquired and compared with preset label information in a display unit so that the label is corrected.

According to the technique of Patent Literature 1, it is necessary for a user to manually correct the label by comparing the preset label information with the reliability output from the image recognition unit. However, it takes a lot of time to manually correct a large number of images. Further, when the label is automatically corrected according to the reliability output from the image recognition unit and the accuracy of the output reliability is not sufficiently high, patterns are learned based on incorrect label information. This leads to a decrease in the accuracy of the image recognition unit.

SUMMARY OF THE INVENTION

Therefore, an object of the invention is to provide an image recognition support apparatus, an image recognition support method, and an image recognition support program capable of supporting creation of a model that recognizes attributes in an image with high accuracy.

One aspect of the invention for solving the above problems provides an image recognition support apparatus including: an image input unit configured to acquire an image; a pseudo label generation unit configured to recognize the acquired image based on a plurality of types of image recognition models and output recognition information, and generate pseudo labels indicating attributes of the acquired image based on the output recognition information; and a new label generation unit configured to generate new labels based on the generated pseudo labels.

Another aspect of the invention for solving the above problems provides an image recognition support method for an information processing apparatus to perform: an image input process of acquiring an image; a pseudo label generation process of recognizing the acquired image based on a plurality of types of image recognition models and outputting recognition information, and generating pseudo labels indicating attributes of the acquired image based on the output recognition information; and a new label generation process of generating new labels based on the generated pseudo labels.

Another aspect of the invention for solving the above problems provides an image recognition support program that causes an information processing apparatus to perform: an image input process of acquiring an image; a pseudo label generation process of recognizing the acquired image based on a plurality of types of image recognition models and outputting recognition information, and generating pseudo labels indicating attributes of the acquired image based on the output respective recognition information; and a new label generation process of generating new labels based on the generated pseudo labels.

According to the invention, since the new label generation unit (process) generates new labels based on pseudo labels generated by the pseudo label generation unit (process) by using a plurality of types of image recognition models, it is possible to gradually generate new labels having a high reliability from the pseudo labels obtained intermediately. Accordingly, labels of learning data having high reliability are generated without manual confirmation (visual confirmation or the like). Therefore, it is possible to generate a learning model having high accuracy based on data including errors.

Problems, configurations, and effects other than those described above will be apparent according to the following description of embodiments.

DESCRIPTION OF THE PREFERRED EMBODIMENTS

Hereinafter, an embodiment of the invention is described with reference to the drawings. For clarity of description, the following description and drawings may be omitted and simplified as appropriate. The invention is not limited to the embodiment described herein, and all application examples meeting ideas of the invention are included in the technical scope of the invention. For each element, unless otherwise specified, the number of the element referred to may be singular or plural.

System Configuration

Figure 1:
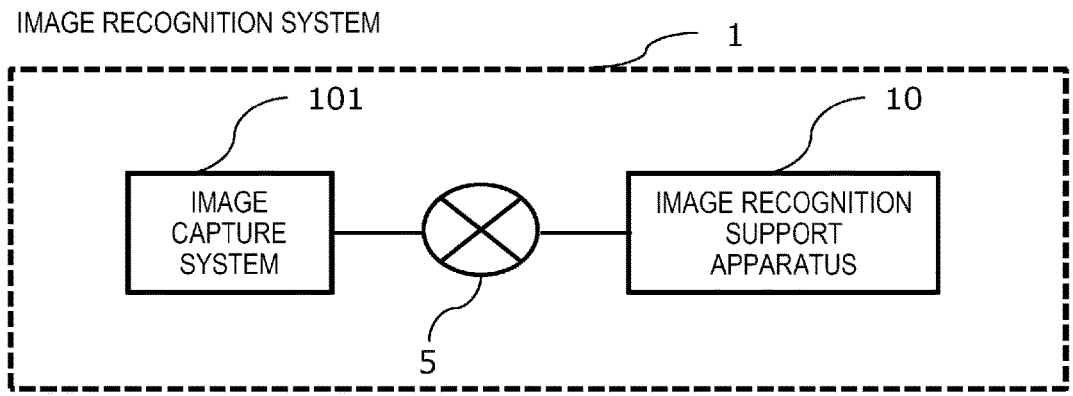
FIG. 1 is a diagram showing an outline of a configuration of an image recognition system according to an embodiment.

FIG. 1 is a diagram showing an outline of a configuration of an image recognition system 1 according to the present embodiment. The image recognition system 1 includes an image capture system 101 that captures an image, and an image recognition support apparatus 10 that generates an image recognition model based on the image captured by the image capture system 101. The image capture system 101 and the image recognition support apparatus 10 are communicably connected over, for example, a local area network (LAN), a wide area network (WAN), the Internet, or a wired or wireless network 5 such as a dedicated line.

The image capture system 101 includes one or a plurality of image capture devices (cameras) for capturing images. The image capture device may be, for example, an image capture device carried by a person or a device fixed to the ground, may be an image capture device provided at a car or the like moving on the ground, and may be an image capture device provided at a Drone, an aircraft or the like.

Images captured by the image capture system 101 include images of one or more subjects (objects), and a user can associate each object with one of attributes (categories) listed in advance. The attributes may be, for example, a person, may be an artifact such as a building, a car, or a road, may be a natural object such as the sea or a river, and may indicate a condition of an object or a person such as a flood, collapse of a building, a traffic jam, or a crowded state of people.

The images may be either color images or monochrome images. In addition to images taken by a camera, the images may be synthetic aperture radar (SAR) images, computer graphics (CG) images, or other types of images acquired in advance. Meta information may be attached to the images.

The image recognition support apparatus 10 acquires the images captured by the image capture system 101. The image recognition support apparatus 10 generates a plurality of classifiers (learned models) having different configurations regarding recognition of attributes of the images. The image recognition support apparatus 10 inputs an image specified by the user (designated image) to the generated classifiers, and generates new labels by comparing values of labels obtained based on output values of the classifiers (pseudo labels) with values of labels preset by the user for the above designated image (original labels) for each attribute.

The new labels generated in such a way are information that correctly reflect attributes of the designated image.

Then, the image recognition support apparatus 10 generates the image recognition model by performing machine learning that learns relations between a plurality of designated images and new labels that are in combinations.

Original Label, Pseudo Label, and New Label

Figure 2:
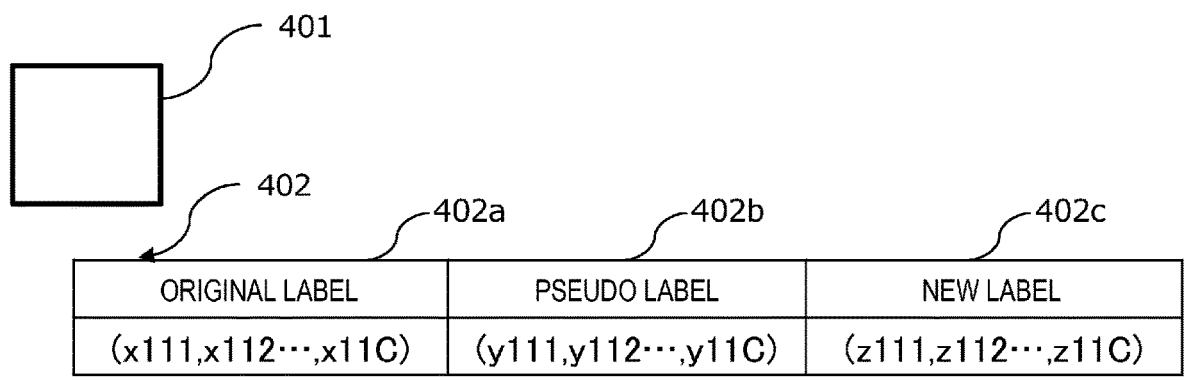
FIG. 2 is a diagram showing examples of an original label, a pseudo label, and a new label.

FIG. 2 is a diagram showing examples of the original label, the pseudo label, and the new label. As shown in FIG. 2, label information 402 (original label, pseudo label, and new label) is set for an image 401.

At a learning time point (epoch) in a machine learning process of a classifier to be described later, the label information 402 is information on a probability that the image 401 includes a certain attribute, or information indicating whether a certain attribute is present in the image 401. An original label 402*a* of the label information 402 is set in advance by a user or the like, and the original label 402*a* may include an error. A pseudo label 402*b* is automatically set by a pseudo label generation unit 202 to be described later. A new label 402*c* is automatically set by a new label generation unit 203 to be described later based on the original label 402*a* and the pseudo label 402*b*.

Regarding the description of the label information 402 in FIG. 2, for example, "x123" indicates an original label of an attribute "3" that is set when the epoch (number of trials of machine learning) regarding an image having an ID "1" is "2". Further, "y342" indicates a pseudo label of an attribute "2" that is set when the epoch regarding an image having an ID "3" is "4". Further, "z567" indicates a new label of an attribute "7" that is set when the epoch regarding an image having an ID "5" is "6". The pseudo label and the new label may be different for each epoch, and the original label is common to all epochs.

Figure 3:
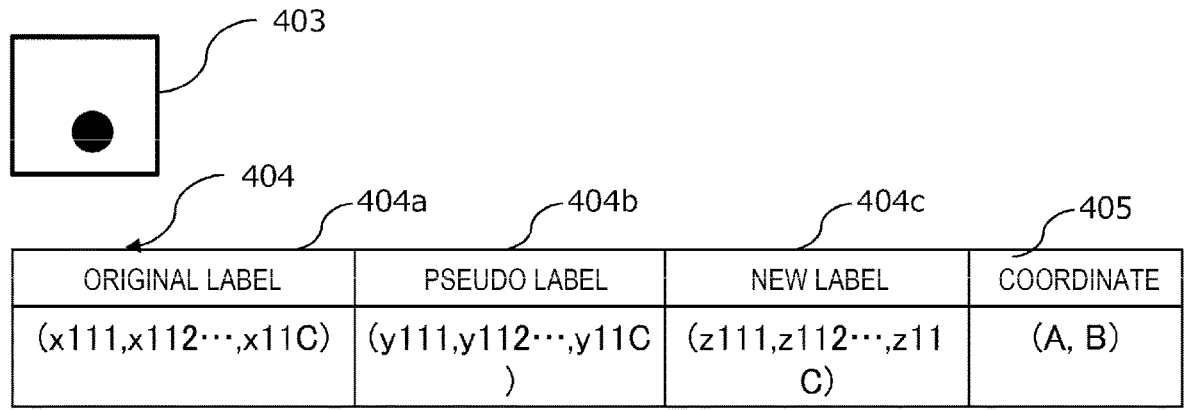
FIG. 3 is a diagram showing other examples of the original label, the pseudo label, and the new label for an image.

Next, FIG. 3 is a diagram showing other examples of the original label, the pseudo label, and the new label for an image. As shown in FIG. 3, label information 404 (original label, pseudo label, and new label) is set for an image 403. An original label 404*a*, a pseudo label 404*b*, and a new label 404*c* of the label information 404 are the same as the original label 402*a*, the pseudo label 402*b*, and the new label 402*c* described above. Unlike in FIG. 2, coordinate information 405 indicating positions of subjects of the attributes in the image 403 is added to the label information 404.

As shown in the above label information 402 and 404, by creating new labels 402*c* and 404*c*, which are more accurate labels than the original labels 402*a* and 404*a* that may include an error, and using the new labels 402*c* and 404*c* into the image recognition model, the image recognition support apparatus 10 is capable of correctly recognizing all attributes included in an image that is specified by the user and is subjected to image recognition.

Image Recognition Support Apparatus

Figure 4:
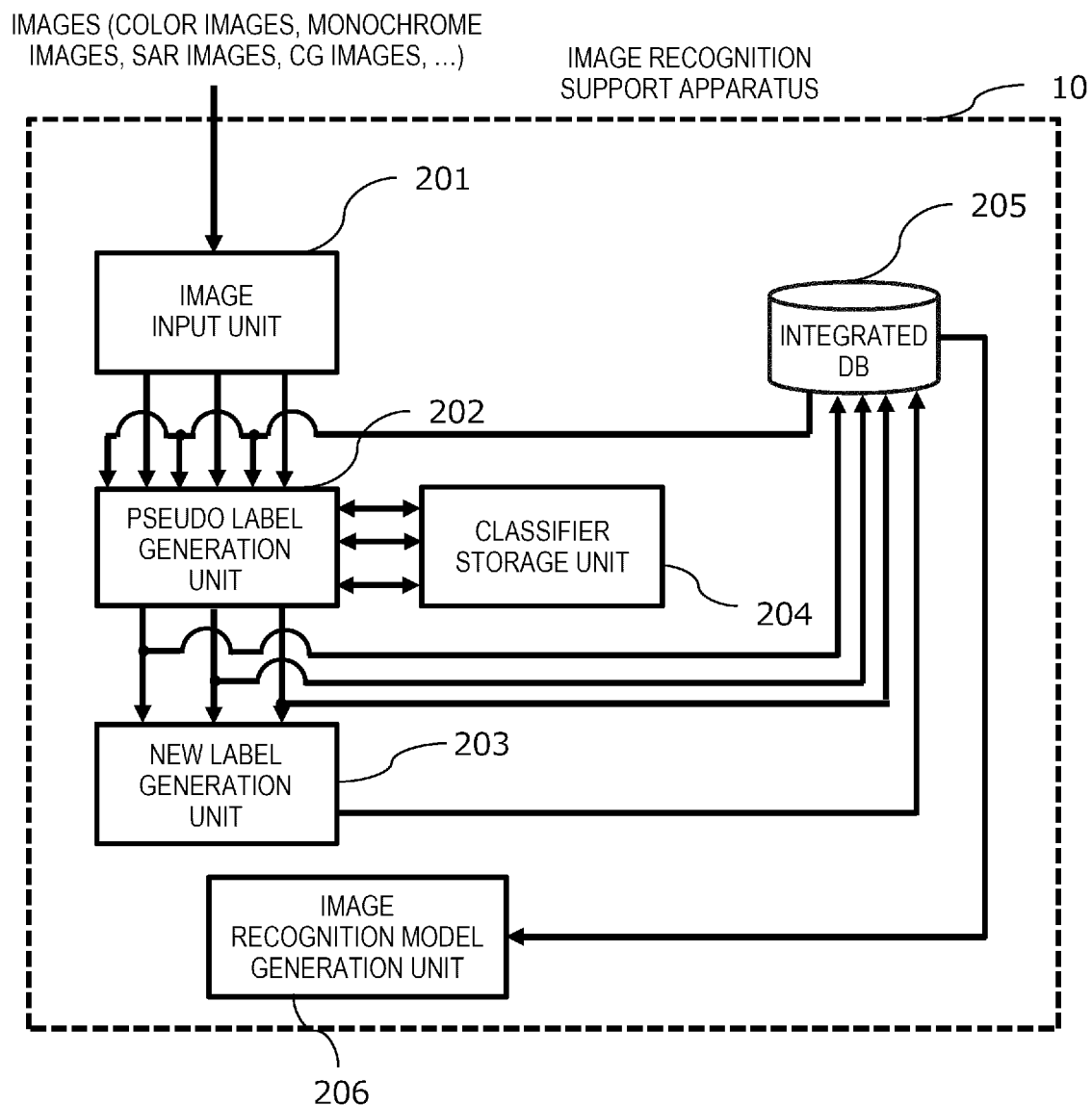
FIG. 4 is a block diagram showing an example of functions provided in an image recognition support apparatus.

Next, FIG. 4 is a block diagram showing an example of functions provided in the image recognition support apparatus 10. The image recognition support apparatus 10 includes functional units (programs) including an image input unit 201, a pseudo label generation unit 202, a new label generation unit 203, a classifier storage unit 204 and an image recognition model generation unit 206. The image recognition support apparatus 10 stores an integrated database (DB) 205.

The image input unit 201 acquires images captured by the image capture system 101, and stores the acquired images in the integrated DB 205. In addition, the image input unit 201 inputs the images to the pseudo label generation unit 202.

The pseudo label generation unit 202 recognizes the images acquired by the image input unit 201 by using a plurality of types of image recognition models (classifiers) and outputs recognition information, and generates pseudo labels indicating attributes of the acquired images based on the output recognition information.

Specifically, first, the pseudo label generation unit 202 generates and stores a plurality of types of classifiers that receive an image and output recognition information on attributes of the image. In the present embodiment, the recognition information is set as reliability as a probability (certainty) that the image has the attributes.

The classifiers are generated based on the images stored in the integrated DB 205 and labels of the images (original labels, and new labels to be described later if present), and are generated such that tendencies of the recognition information on the attributes to be output according to characteristic values relating to the attributes of the images are different.

In the present embodiment, the characteristic values of the attributes are set as occurrence frequencies of the attributes (probabilities that the attributes are present in the image). The occurrence frequencies herein may be occurrence frequencies of attributes in all images that are captured by the image capture system 101, may be occurrence frequencies of attributes in a specific image group, and may be occurrence frequencies statistically derived.

The classifiers are learned models generated based on deep learning. An example of such classifiers includes a convolutional neural network constructed by an information network having a plurality of layers.

Then, the pseudo label generation unit 202 inputs a designated image received from the image input unit 201 into each of the plurality of classifiers to recognize the attributes of the image, and outputs results thereof as the recognition information.

Next, based on the recognition information (reliability) of the attributes output from the plurality of classifiers and predetermined coefficients (weighting coefficients) associated with combinations of the classifiers and the attributes, the pseudo label generation unit 202 calculates integrated recognition information on the attributes of the designated image (hereinafter, also referred to as integrated reliability, details will be described later), and generates pseudo labels obtained by performing a predetermined conversion to the integrated recognition information.

The pseudo label generation unit 202 inputs the integrated recognition information on the attributes and the pseudo labels to the new label generation unit 203.

The new label generation unit 203 generates new labels based on the pseudo labels generated by the pseudo label generation unit 202.

Specifically, the new label generation unit 203 calculates accuracies of the pseudo labels for each attribute (accuracy rates of the labels) based on the integrated recognition information on the attributes received from the pseudo label generation unit 202. The new label generation unit 203 generates new labels for the attributes of the designated image, which is obtained by correcting the pseudo labels of the attributes of the designated image based on the calculated accuracies.

The generated new labels are stored in the integrated DB 205. The generated new labels are repeatedly used in the machine learning of the classifiers performed by the pseudo label generation unit 202.

The classifier storage unit 204 stores the classifiers. The classifier storage unit 204 stores information on the accuracy of the pseudo label, learning parameters in the classifiers, the recognition information on the attributes obtained by the classifiers, or the like. The above information is used, for example, in the generation of the pseudo labels by the classifiers, or in the machine learning of the classifiers.

The integrated DB 205 stores original labels, label information, capture times, map information, and the like of images. For example, the integrated DB 205 stores IDs, epochs, original labels, pseudo labels, and new labels of images.

Based on the images stored in the integrated DB 205 and the new labels of the images, the image recognition model generation unit 206 generates a learned model (image recognition model) that recognizes attributes of an image. For example, the image recognition model generation unit 206 generates a learned model that receives an image as an input value and outputs recognition information (reliability or the like) on attributes of the image by learning relations between designated images and new labels corresponding to the designated images. The learned model is, for example, a neural network (convolutional neural network) having a plurality of layers.

Integrated DB

Figures 5, 6:
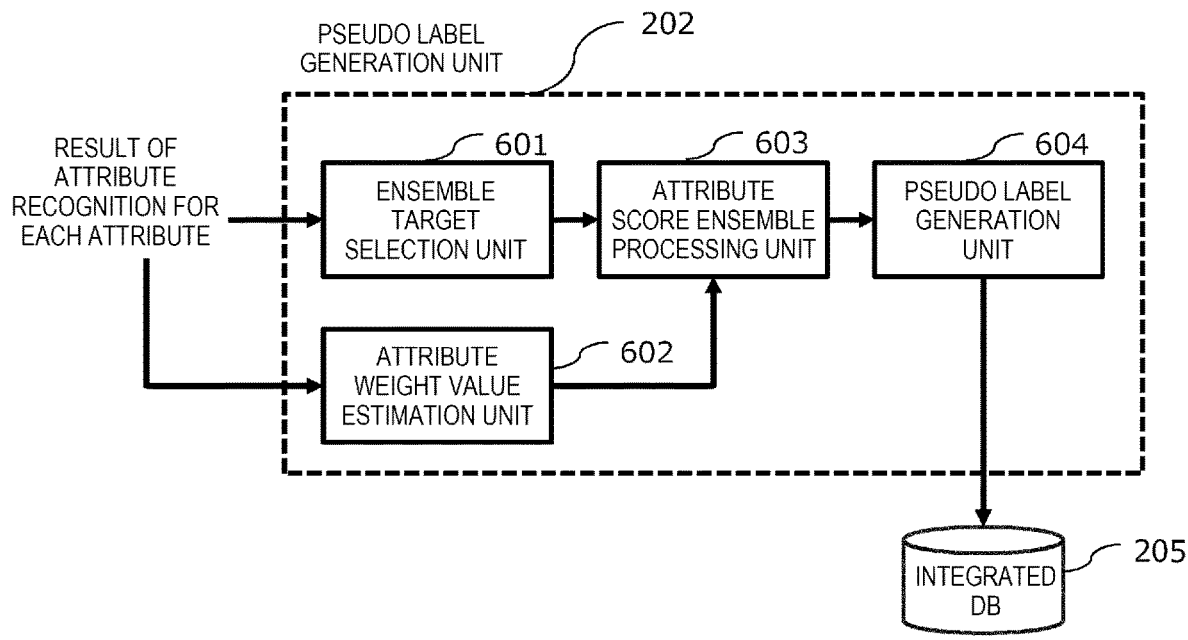
FIG. 5 is a diagram showing an example of information stored in an integrated DB.
FIG. 6 is a diagram showing details of a pseudo label generation unit.

Herein, FIG. 5 is a diagram showing an example of information stored in the integrated DB 205. The integrated DB 205 includes data items of an ID 302 in which identifiers of the images are set, capture time 303 in which capture dates and time of the images are set, an epoch 304 in which the epochs (specifically, the number of trials for performing processes of S1002 to S1007 to be described later) are set, an original label 305 in which the original labels set for the attributes of the images are set, a pseudo label 306 in which the pseudo labels set by the classifiers are set for the attributes of the images, and a new label 307.

The recognition information (reliability or the like) on the attributes included in the images is set in the original label 305, the pseudo label 306, and the new label 307. The original label 305 is set to include labels set by the user in advance. Further, the data items described herein are examples, and for example, information such as metadata of the images may be included.

Pseudo Label Generation Unit

Next, FIG. 6 is a diagram showing details of the pseudo label generation unit 202. The pseudo label generation unit 202 includes functional units (programs) including an ensemble target selection unit 601, an attribute weight value estimation unit 602, an attribute score ensemble processing unit 603 and a pseudo label generation unit 604.

The ensemble target selection unit 601 selects a plurality of classifiers used to generate a pseudo label.

Based on the characteristic values (occurrence frequencies in the present embodiment) of the attributes of the images in the integrated DB 205, the attribute weight value estimation unit 602 sets values (weighting coefficients) relating to learning weights of the attributes in the machine learning by the classifiers. In the present embodiment, the weighting coefficients are set to be automatically calculated based on the characteristic values of the attributes and hyper parameters of the attributes in the classifiers.

Based on output values for the images input to the classifiers selected by the ensemble target selection unit 601

(reliability of the attributes) and the weighting coefficients set by the attribute weight value estimation unit 602, the attribute score ensemble processing unit 603 calculates the recognition information (integrated reliability) for the attributes of the images.

The pseudo label generation unit 604 converts the integrated reliability of the attributes calculated by the attribute score ensemble processing unit 603 into pseudo labels. For example, the pseudo label generation unit 604 converts the integrated reliability that is a continuous value into a value (for example, 0 or 1) of the pseudo label that is a discrete value.

New Label Generation Unit

Figure 7:
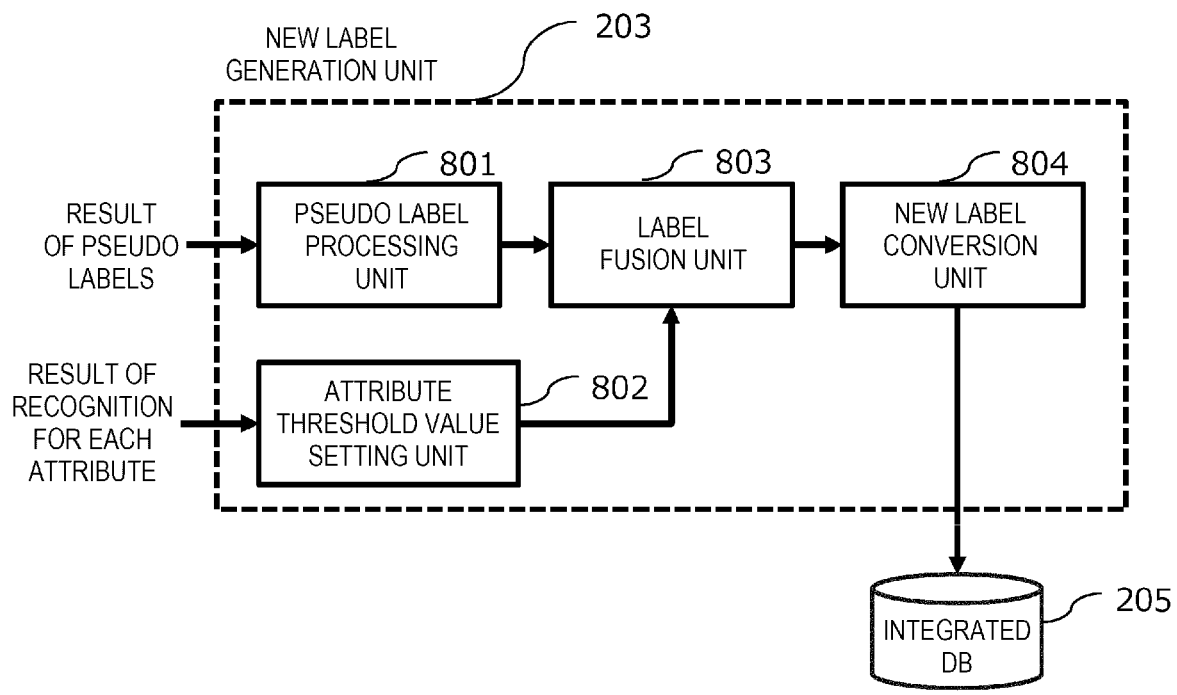
FIG. 7 is a diagram showing details of a new label generation unit.

Next, FIG. 7 is a diagram showing details of the new label generation unit 203. The new label generation unit 203 includes functional units (programs) of a pseudo label processing unit 801, an attribute threshold value setting unit 802, a label fusion unit 803, and a new label conversion unit 804.

The pseudo label processing unit 801 performs the same process (conversion from the reliability to a label value) as the pseudo label generation unit 604. The pseudo label processing unit 801 performs this process when the above process is not performed in the pseudo label generation process.

The attribute threshold value setting unit 802 sets a parameter (threshold value) for determining, regarding the attributes of the designated image, whether to use the pseudo labels generated by the pseudo label generation unit 202 as the new labels of the designated image by comparing the pseudo labels with the original labels. Specifically, the attribute threshold value setting unit 802 sets a large value to the threshold value related to a certain attribute when recognition accuracy of the attribute (probability that the value of the original label and the value of the pseudo label relating to a certain attribute are the same) is high, and sets a small value to the threshold value related to a certain attribute when the recognition accuracy of the attribute is low.

The new label fusion unit 803 generates new labels for the attributes based on the pseudo labels for the attributes generated by the pseudo label processing unit 801 and the threshold values of the attributes generated by the attribute threshold value setting unit 802.

The new label conversion unit 804 converts the labels in the same manner as the pseudo label generation unit 604.

For example, when the values of the new labels for the attributes generated by the new label fusion unit 803 are reliability and the reliability of a certain attribute of the attributes is 0.5 or higher, the new label conversion unit 804 sets the value of the new label to "1" that means that the image includes this attribute, and when the reliability of a certain attribute of the attributes is less than 0.5, the new label conversion unit 804 sets the value of the new label to "0" that means that the image does not include this attribute. The conversion method of the value described herein is an example, and any other method may be adopted.

Figure 8:
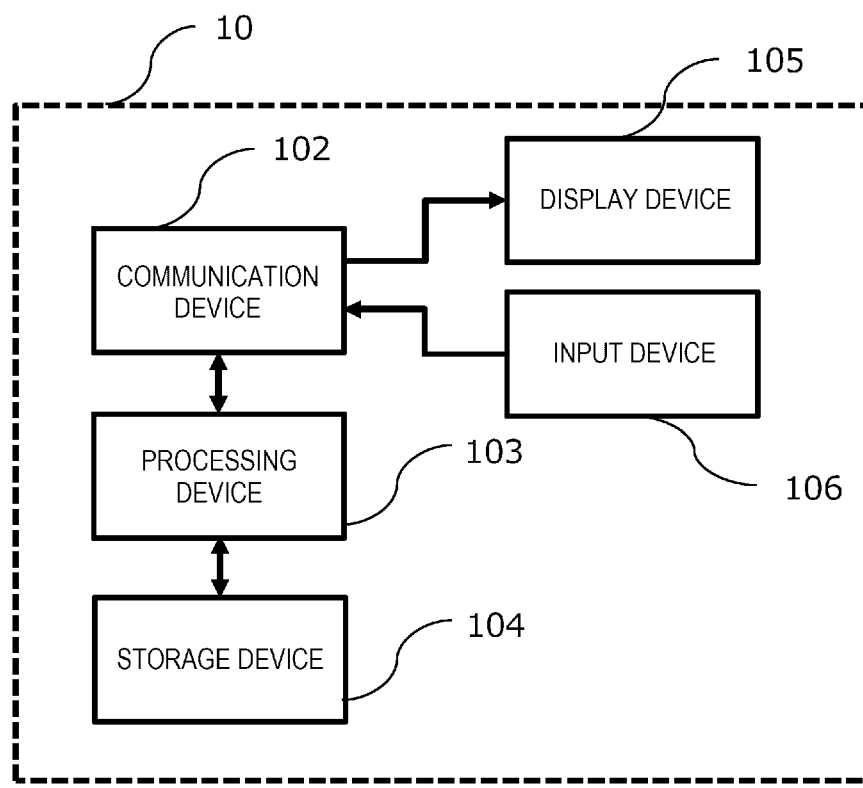
FIG. 8 is a diagram showing an example of hardware provided in the image recognition support apparatus.

Herein, FIG. 8 is a diagram showing an example of hardware included in the image recognition support apparatus 10. The image recognition support apparatus 10 includes a processing device 103 such as a central processing unit (CPU), a digital signal processor (DSP), a graphics processing unit (GPU), a field-programmable gate array (FPGA); a storage device 104 configured with a memory device such as a read-only memory (ROM), a random-access memory (RAM), a hard disk drive (HDD) and a solid state drive (SSD), or a storage medium; a display device 105 configured with a liquid crystal display, an organic electroluminescence (EL) display, or the like; an input device 106 configured with a mouse, a keyboard, or the like; and a communication device 102 configured with a network interface card (NIC), a wireless communication module, a universal serial interface (USB) module, a serial communication module, or the like.

The display device 105 displays the images captured by the image capture system 101 and the information on the labels (pseudo labels, new labels or the like).

The input device 106 receives an input from the user. For example, the input device 106 receives an input for switching the classifiers to be displayed by the display device 105, and receives from the user the setting or correction of the labels relating to the images captured by the image capture system 101.

Functions of the image recognition support apparatus 10 are implemented by the processing device 103 reading and running the programs stored in the storage device 104. The above programs may be recorded in a recording medium and be distributed, for example.

Next, the processes performed by the image recognition support apparatus 10 will be described.

Image Recognition Support Process

Figure 9:
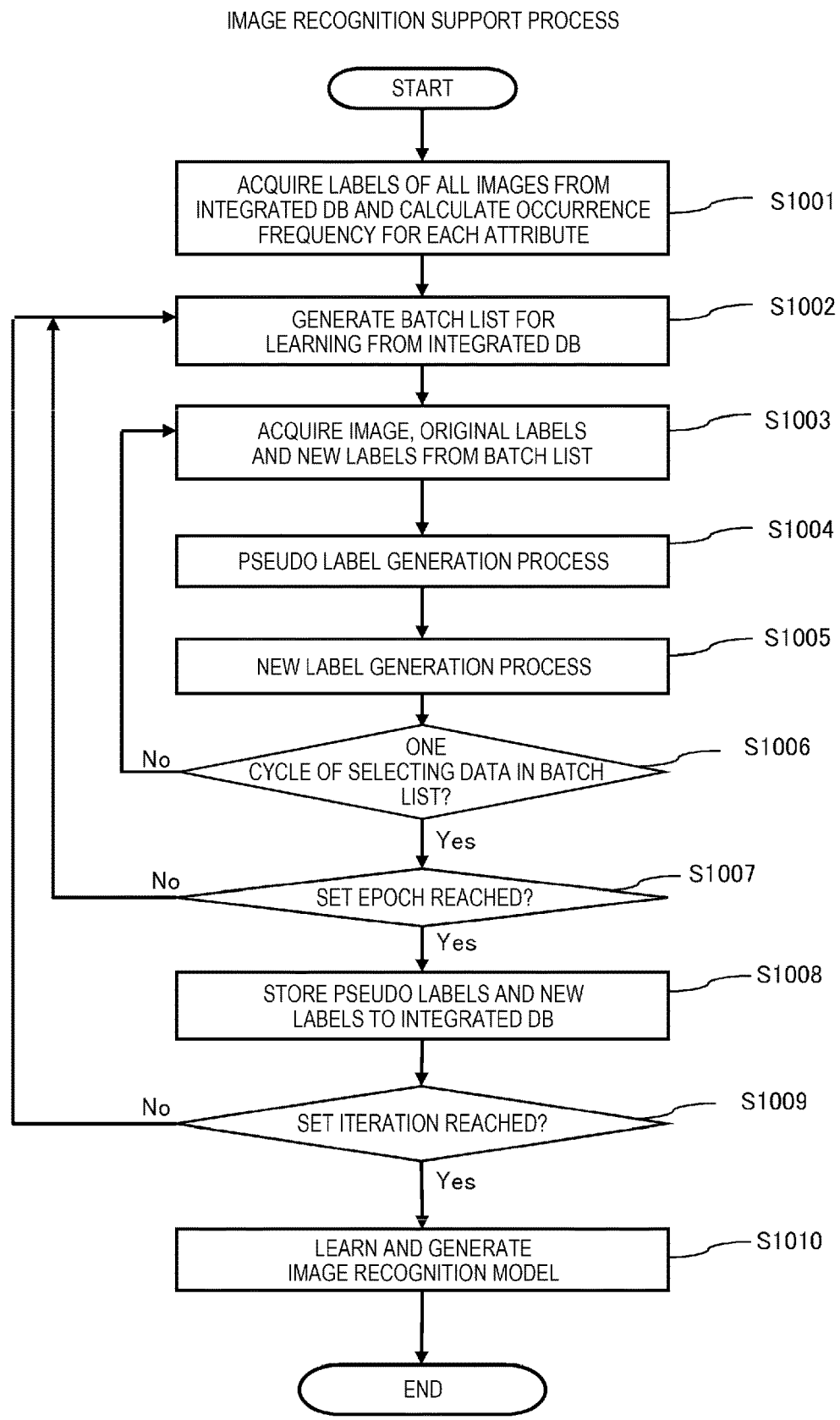
FIG. 9 is a flowchart showing an example of an image recognition support process performed by the image recognition support apparatus.

FIG. 9 is a flowchart showing an example of the image recognition support process performed by the image recognition support apparatus 10. The process is started, for example, when the images captured by the image capture system 101 are stored in the integrated DB 205, or a predetermined input from the user is input to the image recognition support apparatus 10.

First, the pseudo label generation unit 202 calculates the occurrence frequencies of the attributes based on the original labels of the images stored in the integrated DB 205, and stores results thereof (step S1001).

In the present embodiment, the pseudo label generation unit 202 specifies the attributes of the images having a frequency less than a predetermined first threshold value as "low-frequency attributes" and specifies the images as "low-frequency images", respectively. The pseudo label generation unit 202 specifies the attributes of the images having a frequency equal to or greater than the first threshold value and less than a second threshold value as "medium-frequency attributes" and specifies the images as a "medium-frequency images". Further, the pseudo label generation unit 202 specifies the attributes of the images having a frequency equal to or greater than the second threshold value as "high-frequency attributes" and specifies the images as "high-frequency images".

The pseudo label generation unit 202 generates information on a list of all the images stored in the integrated DB 205 as a batch list and stores the information (step S1002). The information on the batch list includes, for example, index information on the images and information on the labels (original labels or new labels) relating to the images. The information on this batch list is information generally used in the deep learning.

Next, the pseudo label generation unit 202 selects one image from the batch list generated in step S1002, and extracts information such as the original labels and the new labels of the selected image (step S1003). When step S1003 is performed at first, the information on the new labels is not present.

The pseudo label generation unit 202 performs the pseudo label generation process that creates pseudo labels based on the image selected in step S1003 and the information on the labels of the image (step S1004). Details of the pseudo label generation process S1004 will be described later.

In the present embodiment, the pseudo label generation unit 202 generates pseudo labels by generating a plurality of different classifiers according to the occurrence frequencies of the attributes. That is, the pseudo label generation unit 202 generates a low-frequency-emphasized model that emphasizes the low-frequency images the most among the high-frequency images, the medium-frequency images, and the low-frequency images and performs learning, generates a medium-frequency-emphasized model that emphasizes the medium-frequency images the most and performs learning, and generates a high-frequency-emphasized model that emphasizes the high-frequency images the most and performs learning. Specifically, the pseudo label generation unit 202 generates the classifiers by maximizing learning weights of the high-frequency images, the medium-frequency images, and the low-frequency images.

In this way, by providing classifiers having different characteristics, it is possible to achieve an image recognition performance having higher accuracy than that achieved when only a single classifier is used.

The new label generation unit 203 performs a new label generation process S1005 that generates new labels based on the pseudo labels of the attributes generated by the pseudo label generation unit 202 and the accuracies (accuracy rates) of the pseudo labels of the attributes obtained by the classifiers (step S1005). The new labels generated are used to learning by the classifiers in place of the original labels at the next epoch. Details of the new label generation process S1005 will be described later.

The new label generation unit 203 confirms whether all the images are selected from the batch list (step S1006). When there are images not selected from the batch list (step S1006: No), the pseudo label generation unit 202 selects one of these images and repeats the processes after step S1003 to continue the machine learning of the neural network. When there is no image not selected from the batch list (step S1006: Yes), step S1007 is performed.

In step S1007, the new label generation unit 203 confirms whether a predetermined epoch (number of times that the learning is performed) is reached. When the epoch is not reached (step S1007: No), the pseudo label generation unit 202 repeats the processes after step S1002. When the epoch is reached (step S1007: Yes), step S1008 is performed.

In step S1008, the new label generation unit 203 stores the pseudo labels and the new labels of the images and the results of the recognition of the attributes obtained by the classifiers in the integrated DB 205.

Next, the new label generation unit 203 determines whether the number of repetitions (iteration) specified in advance is reached (step S1009). When the iteration is not reached (step S1009: No), the pseudo label generation unit 202 repeats the processes after step S1002. When the iteration is reached (step S1009: Yes), the pseudo label generation unit 202 performs the process of step S1010.

Then, the image recognition support apparatus 10 generates the image recognition model by performing the machine learning that learns relations between the images stored in the integrated DB 205 and the new labels that are in combinations (step S1010). By inputting an image to be subjected to an attribute recognition into this image recognition model, the user can output attributes of the image.

Then, the image recognition support process ends.

Pseudo Label Generation Process

Figure 10:
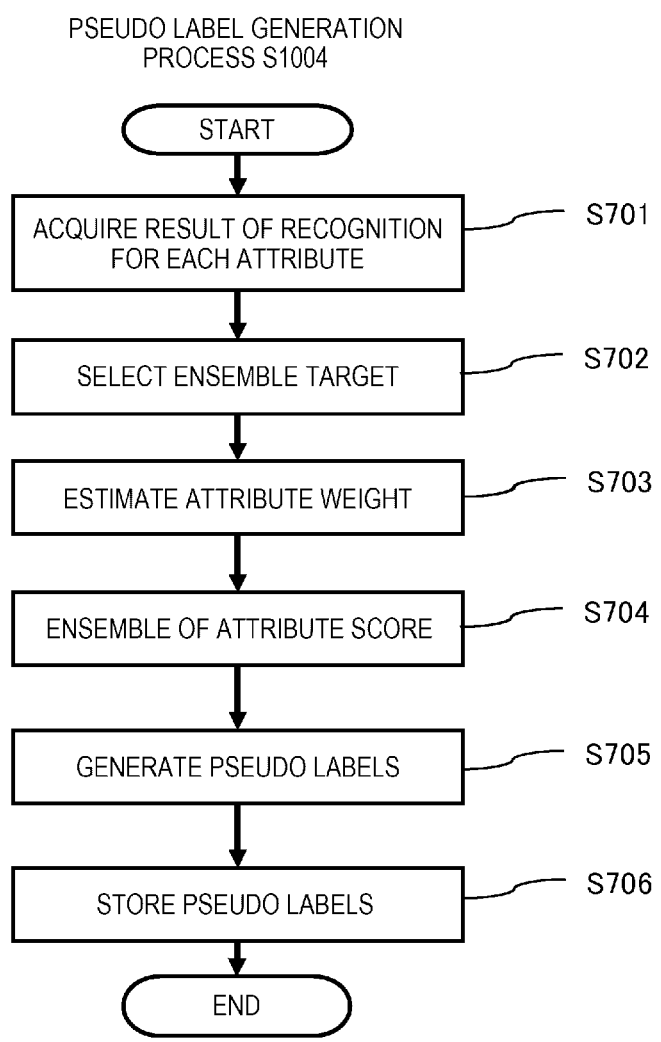
FIG. 10 is a flowchart showing details of a pseudo label generation process.

FIG. 10 is a flowchart showing details of the pseudo label generation process S1004.

The pseudo label generation unit 202 acquires the reliability for each attribute of the designated image, and the reliability is output from the classifiers after the classifiers receive the designated image (step S701). The reliability indicates, for example, probabilities that the attributes are present in the designated image in a range of 0 to 1.

The ensemble target selection unit 601 selects a classifier used for generating a pseudo label from all the classifiers stored in the classifier storage unit 204 (step S702).

In such a case, the ensemble target selection unit 601 may select all the classifiers, may only select a classifier having a good recognition result (for example, a classifier that recognizes a correct attribute with a predetermined probability or higher in the processes so far) from the classifiers, and may select a classifier according to other predetermined criteria.

The attribute weight value estimation unit 602 sets the weighting coefficient (at the time of learning) of the attribute in the classifier based on the occurrence frequency of the attribute obtained in step S1001 (step S703).

For example, the attribute weight value estimation unit 602 sets the weight coefficient of the output corresponding to the low-frequency images in the high-frequency-emphasized model to 0.3 (small value), and sets the weight coefficient of the output corresponding to the low-frequency images in the low-frequency-emphasized model to 0.7 (large value). The weighting coefficient is automatically determined, for example, by being set as the hyper parameters (occurrence frequencies of the attributes) in the neural network.

The attribute score ensemble processing unit 603 calculates the integrated reliability based on the classifier selected in step S702 and the weighting coefficient of the attribute set in step S703 (step S704).

Figure 11:
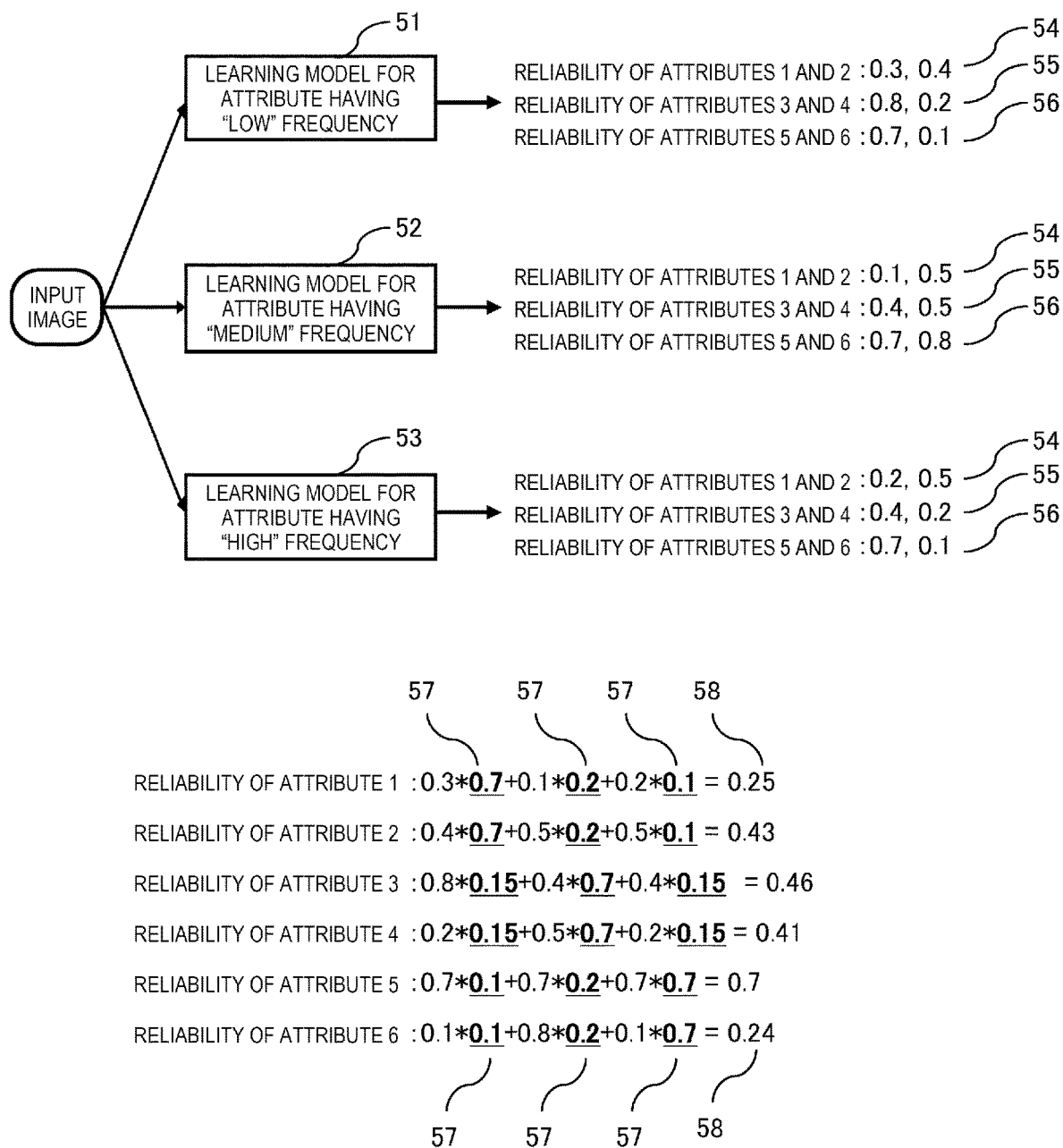
FIG. 11 is a diagram showing an example of a reliability calculation method.

FIG. 11 is a diagram showing an example of the reliability calculation method. As shown in FIG. 11, three classifiers including a low-frequency-emphasized model 51, a medium-frequency-emphasized model 52, and a high-frequency-emphasized model 53 are provided as the classifier. Attributes 1 and 2 as the low-frequency attributes are emphasized the most and learned by the low-frequency-emphasized model 51, attributes 3 and 4 as the medium-frequency attributes are emphasized the most and learned by the medium-frequency-emphasized model 52, and attributes 5 and 6 as the high-frequency attributes are emphasized the most and learned by the high-frequency-emphasized model 53.

First, in step S701, the attribute score ensemble processing unit 603 calculates the results of the recognition of the designated image by the classifiers (reliability 54 of the low-frequency attributes 1 and 2, reliability 55 of the medium-frequency attributes 3 and 4, and reliability 56 of the high-frequency attributes 5 and 6) by inputting the designated image to the classifiers (low-frequency-emphasized model 51, medium-frequency-emphasized model 52 and high-frequency-emphasized model 53). The attribute score ensemble processing unit 603 acquires an integrated reliability 58 for the attributes by multiplying the reliability 54, 55, 56 calculated by the classifiers by a weighting coefficient 57 set for each classifier and attribute, and summing these multiplication values.

The low-frequency-emphasized model can recognize the low-frequency attributes more accurately than other models, and thus the weighting coefficient (0.7) corresponding to the low-frequency image of the low-frequency-emphasized model is set to a value larger than the weighting coefficients (high-frequency-emphasized model: 0.1, medium-frequency-emphasized model: 0.2) corresponding to the low-frequency images of the other models. The same applies to other attributes, and in the medium-frequency-emphasized model, the medium-frequency attribute is emphasized and the weighting coefficient with a large value is set in advance.

Here, an example of a method for setting the weighting coefficients of the classifiers will be described.

A loss function, Focal Loss $(FL(p_t))=-(1-p_t)^\gamma \times \log(p_t)$, in the machine learning of the classifiers is used, in which the larger a coefficient γ in Focal Loss, the more difficult the recognition is, that is, data of the low-frequency attribute is emphasized. For example, when a coefficient $\gamma_1$ of the low-frequency-emphasized model is set to 3.0, a coefficient $\gamma_2$ of the medium-frequency-emphasized model is set to 2.0, and a coefficient $\gamma_3$ of the high-frequency-emphasized model is set to 1.0 in advance, the coefficients may be set by using, for example, values of a normal distribution having an average value=0 and a variance σ. Here, the value of the normal distribution is a value of a probability density function corresponding to an input variable x. For example, the weighting coefficient (0.7 in the example of FIG. 11) corresponding to the low-frequency image of the low-frequency-emphasized model is a value of the probability density function when x=0 in the normal distribution. The weighting coefficient (0.2 in the example of FIG. 11) corresponding to the image of the low-frequency attribute of the medium-frequency-emphasized model is a value of the probability density function when $x=|\gamma_1-\gamma_2|$ in the normal distribution. The weighting coefficient (0.1 in the example of FIG. 11) corresponding to the low-frequency image of the high-frequency-emphasized model is a value of the probability density function when $x=|\gamma_1-\gamma_3|$ in the normal distribution. By normalizing these values (for example, the sum of these values is set to 1), the weighting coefficients are calculated (0.7+0.2+0.1=1 in the example of FIG. 11). Therefore, regarding the classifiers, it is possible to automatically set the weighting coefficients emphasizing an attribute that tends to have a high calculated reliability.

Next, as shown in FIG. 10, the pseudo label generation unit 604 generates the pseudo labels based on the reliability of the attributes calculated in step S704 (step S705).

Specifically, the pseudo label generation unit 604 converts the reliability into discrete values. For example, when a value of the reliability of a certain attribute is 0.5 or more, the pseudo label generation unit 604 sets the value of the pseudo label of the attribute to "1" indicating that the attribute is present, and when the value of the reliability of a certain attribute is less than 0.5, the pseudo label generation unit 604 sets the value of the pseudo label of the attribute to "0" indicating that the attribute is not present. The value of the pseudo label described herein is an example, and the value may be set by any other method.

The pseudo label generation unit 604 stores information on the pseudo labels generated in step S705 in the integrated DB 205 (step S706). Specifically, the pseudo label generation unit 604 sets the values of the pseudo labels of the attributes to the pseudo label 306 of the integrated DB 205.

As described above, the pseudo label generation unit 202 generates and stores the pseudo labels by integrating and converting the results of the recognition of the attributes obtained by the classifiers (learned models).

New Label Generation Process

Figure 12:
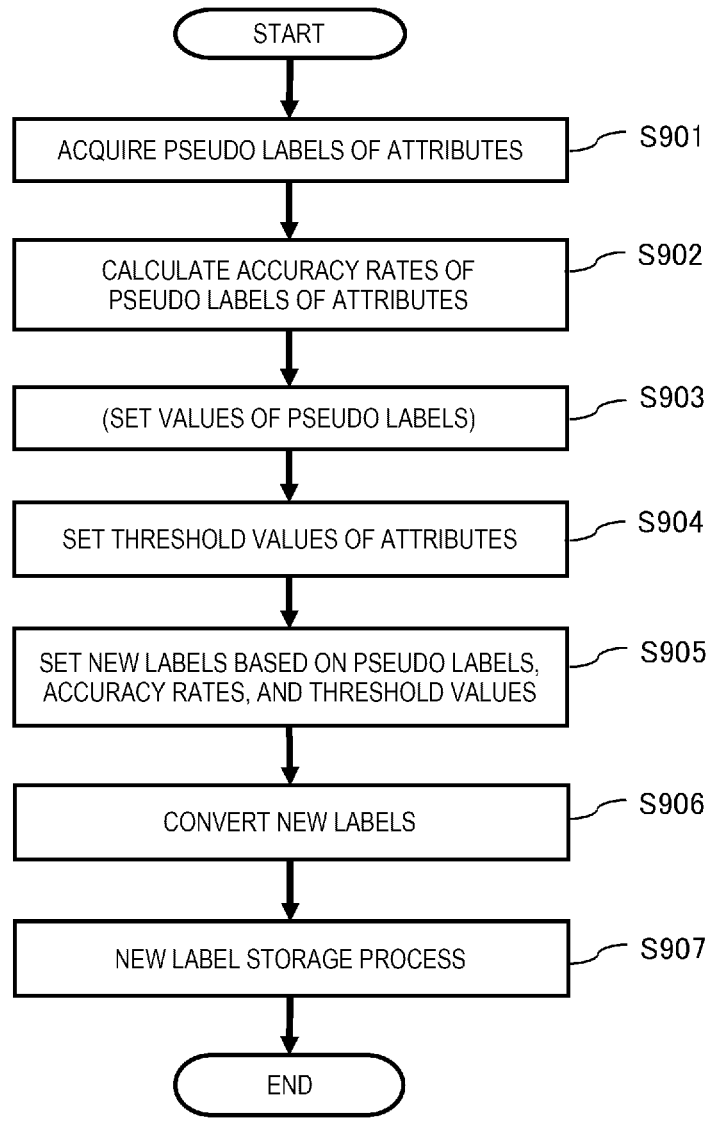
FIG. 12 is a flowchart showing details of a new label generation process.

FIG. 12 is a flowchart showing details of the new label generation process S1005.

The new label generation unit 203 acquires the pseudo labels generated in the pseudo label generation process S1004, and inputs the acquired pseudo labels to the pseudo label processing unit 801 (step S901).

The new label generation unit 203 calculates the accuracy rates as the results of the recognition of the attributes (step S902). The new label generation unit 203 calculates the accuracy rates relating to the attributes of the images by comparing the integrated reliability obtained by the classifiers, which are calculated in the pseudo label generation process S1004, with the values of the original labels of the attributes. The calculation method for the accuracy rate described herein is an example, and the new label generation unit 203 may evaluate the accuracy of the pseudo labels for the attributes of the images by any other method.

When the conversion in step S705 is not performed on the values of the pseudo labels acquired in step S901, the pseudo label processing unit 801 sets values to the pseudo labels of the attributes in the same manner as in step S705 (step S903).

The attribute threshold value setting unit 802 sets the threshold values relating to the attributes based on the accuracy rates calculated in step S902 (step S904).

For example, the attribute threshold value setting unit 802 sets a threshold value in such a manner that if the recognition accuracy of the attribute 1 in the image is 10%, the accuracy of the pseudo label of the attribute 1 is considered to be low, and thus a ratio of using the pseudo label is 0.1 time that of the original label. The attribute threshold value setting unit 802 sets a threshold value in such a manner that if the accuracy of the attribute 1 in the image is 95%, the accuracy of the pseudo label is considered to be high, and thus the ratio of using the pseudo label is 1 time that of the original label. The attribute threshold value setting unit 802 applies these settings to all the attributes. The attribute threshold setting unit 802 may set the threshold values based on the input from the user, and may automatically determine the threshold values based on the values of the recognition accuracies.

The label fusion unit 803 generates new labels for the attributes based on the pseudo labels of the attributes calculated in step S902 (step S903) and the threshold values of the attributes set in step S904 (step S905).

For example, when regarding the attributes 1 to 5, the original labels are (1, 1, 0, 0, 1), the pseudo labels are (1, 0, 0, 1, 1), the threshold values are (1, 1, 1, 0, 1), and the accuracies of the attributes 1 to 5 are 80%, 70%, 90%, 20% and 95%, respectively, since the recognition accuracy of the pseudo label of the attribute 4 is low, the new label fusion unit 803 sets the new label of the attribute 4 as the original label (not the pseudo label). In this way, the new label fusion unit 803 uses the threshold values of the attributes to calculate the new labels of the attributes 1 to 5 to be (1+1)/2=1, (1+0)/2=0.5, (0+0)/2=0, 0, (1+1)/2=1), respectively.

The new label conversion unit 804 converts the new labels calculated in step S905 in the same manner as the pseudo label generation unit 604 (step S906).

When the new label is set to a discrete value, the new label conversion unit 804 sets "1" indicating that the image includes the corresponding attribute if the value of the new label calculated in step S905 is 0.5 or more, and sets "0" indicating that the image does not include the corresponding attribute if the value of the new label is less than 0.5. The method for converting the new label is not limited to the method described here, and various methods may be used.

The classifier storage unit 204 stores the new labels generated in step S906 in the integrated DB 205. The classifier storage unit 204 stores the images, the attributes, the new labels, the classifiers, and the epochs in association with each other in the integrated DB 205.

As described above, the image recognition support apparatus 10 generates and stores the new labels of the images for each attribute by integrating the pseudo labels for each attribute obtained by the classifiers.

Operation Screen

Figure 13:
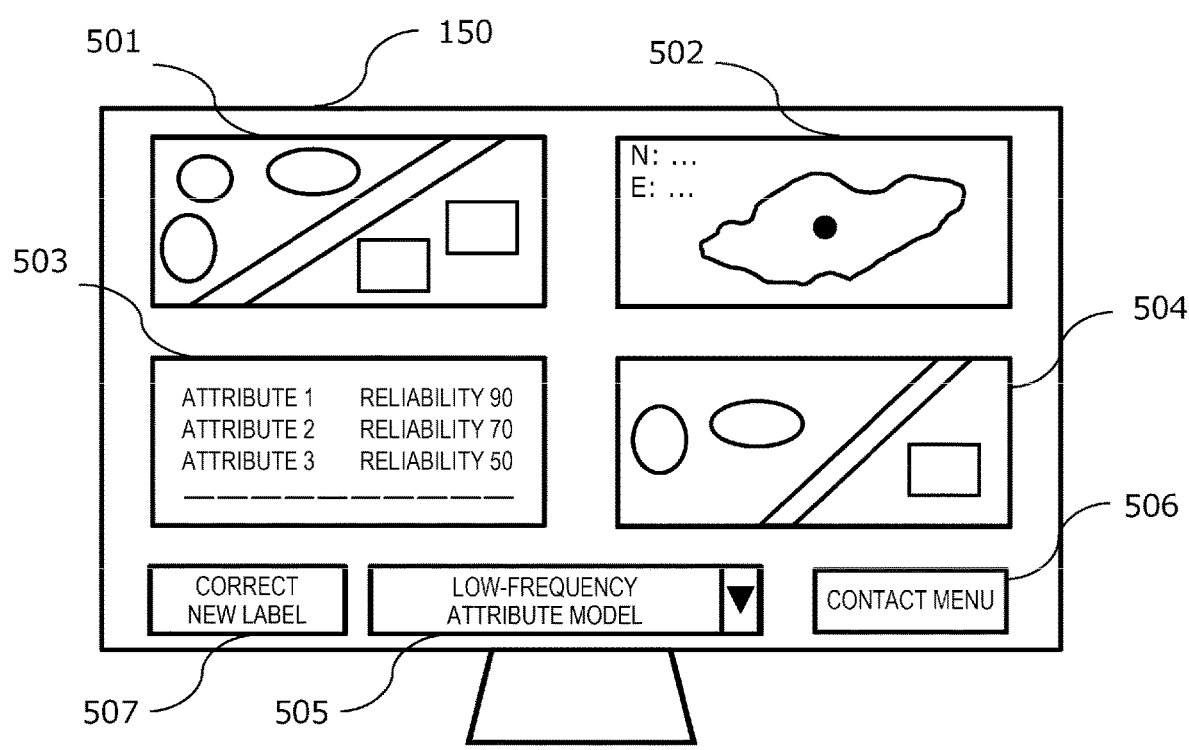
FIG. 13 is a diagram showing an example of a configuration of an operation screen displayed by the image recognition support apparatus.

FIG. 13 is a diagram showing an example of a configuration of an operation screen 150 displayed by the image recognition support apparatus 10. The operation screen 150 includes a recognition target image display field 501, a recognition target map display field 502, a recognition result display field 503, a similar image display field 504, a model switching field 505, and a contact menu 506.

The recognition target image display field 501 displays an image (recognition image) whose attributes are recognized by the classifiers. Here, positions of the recognized attributes (objects or the like) may be displayed on the image or at other predetermined positions in the recognition target image display field 501.

The recognition target map display field 502 displays information such as a latitude and a longitude of a place where the recognition image is acquired and a map of an area of the place. The map in such a case is not limited to a two-dimensional map, and may be displayed as a three-dimensional map if altitude information is provided.

The recognition result display field 503 displays information on the attributes output from the classifiers and related information thereof (information such as the reliability, the pseudo labels, the accuracy rates, the new labels or the like for the attributes). The recognition result display field 503 may display the information on only certain attributes according to a certain criterion or a designation from the user, not the information on all the attributes. For example, only the information on the pseudo labels, the accuracy rates, and the new labels of the attributes having a reliability equal to or greater than a certain value may be displayed.

The operation screen 150 may be provided with a new label correcting field 507 that receives an input for correcting the displayed new label from the user.

The similar image display field 504 displays other images (similar images) in which attributes similar to the attributes in the recognition image are captured. Therefore, the user can have a deeper understanding related to the attributes of the recognition image. Herein, the similar image may be, for example, an image similar in the position on the map, or an image having a similarity in addition to the attributes.

The model switching field 505 receives a designation for classifier switching from the user. The recognition result display field 503 displays the information output from the classifier designated at the model switching field 505 and the related information on the information.

The contact menu 506 receives an input from the user. When the input from the user is received, the contact menu 506 transmits information on a predetermined operation (information on an image capture instruction, a rescue instruction or the like) to a terminal carried by a photographer who captures an image using the image capture system 101 or an operator at an image capture location. The information on the operation includes, for example, information on a predetermined attribute (for example, an attribute having high reliability) among the attributes shown in the recognition result display field 503 (for example, information indicating that the image includes an attribute of a flood or an attribute of a collapsed house).

As described above, the image recognition support apparatus 10 of the present embodiment recognizes an input image by each of the plurality of types of classifiers and outputs the recognition information, generates the pseudo labels indicating the attributes of the input image based on the output recognition information, and generates the new labels based on the generated pseudo labels.

That is, since the image recognition support apparatus 10 generates the new labels based on the pseudo labels generated by the plurality of types of classifiers, it is possible to gradually generate the new labels having high reliability based on the pseudo labels obtained intermediately. In this way, according to the image recognition support apparatus 10 of the present embodiment, it is possible to support creation of models that recognize the attributes in the image with high accuracy. For example, the need for manually modifying the labels is reduced, and the image recognition can be performed more easily and quickly.

Regarding the classifiers, the image recognition support apparatus 10 of the present embodiment inputs the designated image to each of the plurality of types of classifiers that output the reliability of the attributes of the input image with respect to the input image (the tendencies of the recognition information on the attributes to be output according to the characteristic values of the attributes of the image are different), calculates the reliability of the attributes of the designated image based on the reliability of the attributes output from the classifiers, and generates the pseudo labels based on the calculated reliability. Then, the image recognition support apparatus 10 generates the new labels for the attributes of the input image based on the accuracy rates for the attributes of the pseudo labels.

In this way, regarding the attributes that may be present in the image, the image recognition support apparatus 10 is provided with the classifiers having different configurations according to the characteristic values (occurrence frequencies, or the like) of the attributes, generates the pseudo labels by inputting the designated image into these classifiers and integrating the recognition information, and generates the new labels obtained by correcting the pseudo labels based on the accuracies (accuracy rates).

As a result, a label (label necessary for the learning of the learning model) of an image in which various attributes are captured may be automatically and accurately generated. Further, the image recognition model that can correctly recognize the attributes reflected in the image can be generated by using the label.

In addition, the image recognition support apparatus 10 of the present embodiment generates the recognition information based on the weighting coefficients associated with the classifiers and the attributes. Therefore, it is possible to perform the image recognition having high accuracy according to the type of an image and the tendency of a subject in the image.

In addition, the image recognition support apparatus 10 of the present embodiment sets the frequencies at which the attributes occur in the image as the characteristic values relating to the attributes of the image. Therefore, it is possible to perform the image recognition according to characteristics of the attributes of the image.

The image recognition support apparatus 10 of the present embodiment may set the information indicating the certainty of the recognition of the attributes performed by the classifiers, that is, the reliability, as the characteristic values relating to the attributes of the image. Therefore, it is possible to improve the accuracies of identification of the attributes performed by the classifiers. Further, in such a case, step S1002 of calculating the frequencies of the attributes may be omitted.

In addition, the image recognition support apparatus 10 of the present embodiment can facilitate data management relating to the image recognition by storing the designated images, the pseudo labels, and the new labels in the integrated DB 205 in association with each other.

The image recognition support apparatus 10 of the present embodiment can use the image, for example, as an SAP image or a CG image. Therefore, it is also possible to support the image recognition regarding sanitary images, aerial images, synthesis images, or the like. In addition, even when the characteristic values (occurrence frequencies or the like) relating to the attributes are prone to be biased and the label information is prone to include errors as in these images, it is possible to recognize the attributes in the image with high accuracy without performing an additional manual label correcting operation as much as possible.

The image recognition support apparatus 10 of the present embodiment displays the recognition information on the attributes output by the classifiers, and also transmits an operation instruction to a terminal carried by such as an operator associated with the attributes based on the designation from the user. Therefore, it is possible to perform various tasks according to recognition situations of the attributes of the image. For example, it is possible to perform appropriate disaster relief and recovery based on the image showing disaster situations.

In addition, the image recognition support apparatus 10 of the present embodiment displays the recognition information regarding an attribute whose pseudo label has a predetermined value. Therefore, for example, when the attribute is present in the image at a high probability, only the attribute may be provided to the user.

The image recognition support apparatus 10 of the present embodiment displays the new labels of the attributes and receives a change of the new labels from the user. Accordingly, it is possible to set a more appropriate label.

The image recognition support apparatus 10 of the present embodiment at least includes, as the plurality of classifiers, a low-frequency attribute model in which the learning weight of a low-frequency attribute is set higher than learning weights of the other attributes, and a high-frequency attribute model in which the learning weight of a high-frequency attribute is set higher than learning weights of the other attributes, in which the low-frequency attribute is an attribute whose probability of being present in an image is equal to or less than a first threshold value, and the high-frequency attribute is an attribute whose probability of being present in an image is equal to or more than a second threshold value. The image recognition support apparatus 10 inputs the designated image to each of the plurality of classifiers, and generates the total value of the reliability of the attributes of the designated image based on the reliability of the attributes output from each of the plurality of classifiers, and the weighting coefficients according to the occurrence frequencies of the attributes that are associated with the classifiers and the attributes. Therefore, it is possible to generate the pseudo labels having high accuracy for the designated image by providing the plurality of classifiers in which the learning weights for the attributes are changed according to the occurrence frequencies of the attributes and calculating the integrated reliability using the weighting coefficients according to the occurrence frequencies of the attributes.

The invention is not limited to the above embodiment, and may be implemented by using any component within a range not departing from the gist of the invention. The embodiment and various modifications described above are merely examples, and the invention is not limited by these details provided that the distinguishing features of the invention are not lost. Although the embodiment and various modifications are described above, the invention is not limited to the embodiment and modifications. Other embodiments that are regarded within the scope of the technical idea of the invention are also included within the scope of the invention.

For example, a part of the functions included in the devices of the embodiment may be provided in other devices, and the functions included in other devices may be provided in a single device.

Further, in the present embodiment, the occurrence frequencies at which the attributes occur in the image and the reliability are listed as the characteristic values of the attributes, and other characteristic values such as sizes of the attributes in the image and contents of the attributes (for example, an adult or a child) may be adopted.

What is claimed is:

1. An image recognition support apparatus comprising:
an image input unit configured to acquire an image;
at least one processor configured to
recognize an acquired image based on a plurality of types of image recognition models and output recognition information, and generate pseudo labels indicating attributes of the acquired image based on the output recognition information; and
generate new labels based on the generated pseudo labels,
input the acquired image to a plurality of classifiers in which properties of the recognition information relating to attributes of an input image are different, the recognition information being output according to characteristic values relating to the attributes of the input image, generate integrated recognition information on the attributes of the acquired image based on the recognition information on the attributes output from the plurality of classifiers, and generate the pseudo labels based on the integrated recognition information,
calculate accuracies of the pseudo labels for each attribute, and generate the new labels for the attributes of the acquired image based on the calculated accuracies, wherein
the plurality of classifiers at least include a low-frequency attribute model that is a learning model in which a learning weight of a low-frequency attribute is set higher than learning weights of the other attributes, and a high-frequency attribute model that is a learning model in which a learning weight of a high-frequency attribute is set higher than learning weights of the other attributes, the low-frequency attribute being an attribute whose probability of being present in an image is equal to or less than a first threshold value, the high-frequency attribute being an attribute whose probability of being present in an image is equal to or more than a second threshold value greater than the first threshold value, and
input the acquired image to the plurality of classifiers, and based on a reliability indicating probabilities that the attributes are present output from the plurality of classifiers and weighting coefficients according to occurrence frequencies of the attributes that are associated with the classifiers and the attributes, generate a total value of the reliability of the attributes of the acquired image.

2. The image recognition support apparatus according to claim 1, wherein
the at least one processor generates the integrated recognition information based on the recognition information on the attributes output from the plurality of classifiers and predetermined weighting coefficients associated with the corresponding classifiers and the corresponding attributes.

3. The image recognition support apparatus according to claim 1, wherein
the at least one processor sets, as the characteristic values relating to the attributes of the image, frequencies at which the attributes occur in the image.

4. The image recognition support apparatus according to claim 1, wherein
the at least one processor sets, as the characteristic values relating to the attributes of the image, information indicating certainty of recognition of the attributes performed by the classifiers.

5. The image recognition support apparatus according to claim 1, further comprising:
a memory configured to store the acquired image, the pseudo labels of the image, and the new labels of the image in association with each other.

6. The image recognition support apparatus according to claim 1, wherein
the image includes a synthetic aperture radar (SAR) image or a computer graphics (CG) image.

7. The image recognition support apparatus according to claim 1, further comprising:
a display configured to display the output recognition information on the attributes, and transmit information on a predetermined operation to a predetermined terminal associated with the attributes based on a designation from a user.

8. The image recognition support apparatus according to claim 7, wherein
the display displays recognition information regarding an attribute for which the integrated recognition information relating to the pseudo labels indicates a predetermined value or a predetermined range.

9. The image recognition support apparatus according to claim 7, wherein
the display displays information on the new labels corresponding to the attributes, and receives a change in the information on the new labels from the user.

10. The image recognition support apparatus according to claim 1, wherein the at least one processor is further configured to
by learning relations between a plurality of the acquired images and the new labels generated corresponding to each of the plurality of images, generate a learned model that receives an image and outputs recognition information on attributes of the image.

11. An image recognition support method for an information processing apparatus to perform:
an image input process of acquiring an image;
a pseudo label generation process of recognizing an acquired image based on a plurality of types of image recognition models and outputting recognition information, and generating pseudo labels indicating attributes of the acquired image based on the output recognition information; and
a new label generation process of generating new labels based on the generated pseudo labels, comprising
inputting the acquired image to a plurality of classifiers in which properties of the recognition information relating to attributes of an input image are different, the recognition information being output according to characteristic values relating to the attributes of the input image, generating integrated recognition information on the attributes of the acquired image based on the recognition information on the attributes output from the plurality of classifiers, and generating the pseudo labels based on the integrated recognition information,
calculating accuracies of the pseudo labels for each attribute, and generating the new labels for the attributes of the acquired image based on the calculated accuracies, wherein
the plurality of classifiers at least include a low-frequency attribute model that is a learning model in which a learning weight of a low-frequency attribute is set higher than learning weights of the other attributes, and a high-frequency attribute model that is a learning model in which a learning weight of a high-frequency attribute is set higher than learning weights of the other attributes, the low-frequency attribute being an attribute whose probability of being present in an image is equal to or less than a first threshold value, the high-frequency attribute being an attribute whose probability of being present in an image is equal to or more than a second threshold value greater than the first threshold value, and
inputting the acquired image to the plurality of classifiers, and based on a reliability indicating probabilities that the attributes are present output from the plurality of classifiers and weighting coefficients according to occurrence frequencies of the attributes that are associated with the classifiers and the attributes, generating a total value of the reliability of the attributes of the acquired image.

12. A storage device configured with a memory device storing an image recognition support program that causes an information processing apparatus to perform:
an image input process of acquiring an image;
a pseudo label generation process of recognizing an acquired image based on a plurality of types of image recognition models and outputting recognition information, and generating pseudo labels indicating attributes of the acquired image based on the output recognition information; and
a new label generation process of generating new labels based on the generated pseudo labels, the process comprising
inputting the acquired image to a plurality of classifiers in which properties of the recognition information relating to attributes of an input image are different, the recognition information being output according to characteristic values relating to the attributes of the input image, generating integrated recognition information on the attributes of the acquired image based on the recognition information on the attributes output from the plurality of classifiers, and generating the pseudo labels based on the integrated recognition information,
calculating accuracies of the pseudo labels for each attribute, and generating the new labels for the attributes of the acquired image based on the calculated accuracies, wherein
the plurality of classifiers at least include a low-frequency attribute model that is a learning model in which a learning weight of a low-frequency attribute is set higher than learning weights of the other attributes, and a high-frequency attribute model that is a learning model in which a learning weight of a high-frequency attribute is set higher than learning weights of the other attributes, the low-frequency attribute being an attribute whose probability of being present in an image is equal to or less than a first threshold value, the high-frequency attribute being an attribute whose probability of being present in an image is equal to or more than a second threshold value greater than the first threshold value, and inputting the acquired image to the plurality of classifiers, and based on a reliability indicating probabilities that the attributes are present output from the plurality of classifiers and weighting coefficients according to occurrence frequencies of the attributes that are associated with the classifiers and the attributes, generating a total value of the reliability of the attributes of the acquired image.

* * * * *